United States Patent [19]
Ullmann

[11] Patent Number: 5,307,588
[45] Date of Patent: May 3, 1994

[54] METHOD OF AND DEVICE FOR ESTABLISHING A VEGETABLE COVER ON AT LEAST PARTIALLY DENUDED LAND

[76] Inventor: Martin Ullmann, Tellenweg 1, CH-9030 Abtwil, Switzerland

[21] Appl. No.: 848,874

[22] Filed: Mar. 10, 1992

[30] Foreign Application Priority Data

Mar. 12, 1991 [CH] Switzerland ............... 00728/91-9

[51] Int. Cl.$^5$ ............................................. A01C 1/04
[52] U.S. Cl. ............................................. 47/56; 47/9
[58] Field of Search ............................. 47/56, 95

[56] References Cited

U.S. PATENT DOCUMENTS

| | | | |
|---|---|---|---|
| 614,002 | 11/1898 | Jenkins | 47/56 |
| 3,139,701 | 7/1964 | Nishiuchi | 47/56 |
| 3,315,408 | 4/1967 | Fisher | 47/56 |
| 3,623,266 | 11/1971 | Nakayama | 47/56 |
| 3,704,544 | 12/1972 | Spanel et al. | 47/56 |

FOREIGN PATENT DOCUMENTS

| | | |
|---|---|---|
| 826516 | 1/1952 | Fed. Rep. of Germany . |
| 2614170 | 10/1988 | France .................. 47/56 |
| 552448 | 12/1956 | Italy ..................... 47/56 |
| 3-290525 | 12/1991 | Japan .................... 47/56 |
| 8946A | of 1907 | United Kingdom ........... 47/56 |

Primary Examiner—Ramon S. Britts
Assistant Examiner—Joanne C. Downs
Attorney, Agent, or Firm—Darby & Darby

[57] ABSTRACT

A netting of cords which are connected to each other by knots or in any other suitable way carries seedlings in the form of sprouted or unsprouted seeds which are confined in and/or otherwise at least partly embedded in and/or simply adhere to the cords. The cords can further carry particles of fertilizer and/or the cords can consist at least in part of decomposable material which then serves as a fertilizer for the seedlings. The netting is spread out over a selected piece of at least partially denuded flat, horizontal or hilly land and is or can be anchored to the ground. The thus applied netting is then watered and/or fertilized or is simply exposed to the elements to promote sprouting and further growth of the seedlings.

18 Claims, 1 Drawing Sheet

METHOD OF AND DEVICE FOR ESTABLISHING A VEGETABLE COVER ON AT LEAST PARTIALLY DENUDED LAND

BACKGROUND OF THE INVENTION

The present invention relates to improvements in methods of and in devices for establishing (including restoring) vegetable covers on at least partially denuded land. More particularly, the invention relates to improvements in methods of and in means for spreading seedlings on barren or partially barren land.

It is known to confine seeds in a non-woven fabric or in an analogous fleece-like flat sheet-like material. It is also known to bond seeds to sheets of filamentary material. Once deposited on a selected piece of land, the filamentary seed carrier is covered with a layer of humus so that the seeds are maintained close to the ground and their roots can penetrate into and become anchored in the ground after a relatively short period of growth. The layer of humus further serves to prevent rapid drying of the seeds and/or sprouts. Attempts to prevent shifting of filamentary seed carrying material relative to a selected piece of land include the utilization of nails or other suitable fasteners. A drawback of the just discussed prior proposal is that a heavy rainfall washes away the layer of humus as well as the seeds, or that such heavy rainfall causes the humus layer to slip away in its entirety, especially if the fibrous seed carrier is spread out on uneven terrain, e.g., on a sloping piece of land.

German Pat. No. 826,516 discloses the utilization of a piece of cord as a carrier of uniformly distributed seeds. The cord is placed onto and is secured to the ground, or is actually embedded in the ground. The patent proposes to employ such cord as a means for uniformly distributing seeds in a corn field or in another field and to utilize a machine for the application of the cord over a selected piece of land. The patented proposal is satisfactory for the planting of seeds which are to develop into relatively large plants, such as corn stalks, trees and other plants which are normally spaced apart at a fixed distance from each other. The cord is supposed to decompose after a relatively short period of contact with the ground. A drawback of the patented proposal is that the cord cannot be used, or is not practical for use on a sloping terrain. Moreover, the application of seeds to uniformly spaced apart portions of a cord is a complex operation irrespective of whether it is carried out by hand or in a specially designed machine.

OBJECTS OF THE INVENTION

An object of the present invention is to provide a novel and improved method of establishing or restoring a dense or loose vegetable cover on at least partially denuded or any other land.

Another object of the present invention is to provide a method which can be practiced irrespective of the inclination of the land to be covered with new or additional vegetation.

A further object of the present invention is to provide a method of restoring or applying (for the first time) vegetation on land which is not readily accessible.

An additional object of the invention is to provide a simple and inexpensive method which can be practiced with readily available and relatively inexpensive equipment.

Still another object of the present invention is to provide a method which can be practiced with or without resorting to specially designed equipment and which can be practiced with advantage in developed as well as in developing countries.

A further object of the present invention is to provide a novel and improved device for the practice of the above outlined method.

Another object of the present invention is to provide a device which can be used to distribute seeds of many or all kinds and which can serve a useful purpose during as well as subsequent to, distribution of seeds on a selected piece of land.

An additional object of the present invention is to provide a novel and improved net-like device for use as a carrier and retainer of seeds.

A further object of the present invention is to provide a netting which can be used as a carrier of seeds as well as a carrier of other materials which are necessary or desirable for satisfactory sprouting of seeds and for satisfactory growth of sprouts.

An additional object of the present invention is to provide novel and improved strands for use in the above outlined netting.

Another object of the present invention is to provide a novel and improved use for fishing nets.

A further object of the invention is to provide a seed carrying device which is designed in such a way that it can be readily applied over hard to reach pieces of land.

An additional object of the present invention is to restore vegetation on ski slopes and other denuded or partly denuded pieces of land.

SUMMARY OF THE INVENTION

One feature of the present invention resides in the provision of a netting or network which comprises a plurality of interconnected cords, and a plurality of seedlings which are carried by the cords. As used herein, the term "seedlings" embraces seeds as well as shoots or sprouts from seeds, e.g., small or miniature nursery plants, small or miniature trees, and the like.

In accordance with a presently preferred embodiment, at least some of the cords include or form enclosures or envelopes and at least some of the seedlings which are carried by the at least some cords are at least partially confined in the respective envelopes. The at least some cords can include pluralities of strands (e.g., in the form of natural or synthetic filaments). At least some of the seedlings which are carried by the at least some cords can be loosely received in the respective envelopes. However, it is equally possible to at least partially embed at least some of the seedlings in the respective cords, e.g., in the cords which include or constitute envelopes.

At least some of the cords can further include elongated cores each of which can be surrounded by the respective envelope, and at least some of the seedlings which are carried by the at least some cords can be carried by the respective cores; for example, seedlings can be bonded to the respective cores by an adhesive, e.g., an adhesive which contains molasses or another fertilizer serving to initiate or promote sprouting.

The netting can further comprise particles of fertilizer which are intermixed with seedlings. Such fertilizer can include humus.

It is further within the purview of the present invention to make at least some of the cords, at least in part, of a decomposable material which can serve as a fertilizer for seedlings. If the integrity of the netting should remain intact for longer or very long intervals of time, at least some of the cords can consist, at least in part, of a non-decomposable material (e.g., a synthetic plastic material). It is also possible to make at least some of the cords in part of decomposable and in part of non-decomposable material.

The seedlings can include seeds which are yet to germinate, e.g., as a result of moistening and fertilizing subsequent to spreading of the netting on a selected piece of land. Alternatively, the seedling can include germinating or sprouting seeds, or such seedlings can include seeds which are already in the process of sprouting as well as seeds which are yet to sprout.

Another feature of the invention resides in the provision of a method of establishing a vegetable cover on at least partially denuded (e.g., totally barren or partially barren) land. The method comprises the steps of providing at least some interconnected (e.g., knotted together) cords of a netting or network with seedlings so that the seedlings are retained by the respective cords, and spreading the netting over the selected piece of (e.g., at least partially denuded) land.

The method can further comprise the step of fertilizing the seedlings including applying fertilizer to the cords, e.g., confining particles of fertilizer in the interior of tubular or twisted together cords.

The providing step can include at least partially embedding at least some of the seedlings in the respective cords.

The method can further comprise the step of making at least some of the cords, at least in part, of a decomposable material which can be selected in such a way that it serves as a fertilizer for the seedlings.

Still further, the method can comprise the step of causing (e.g., by watering and fertilizing) at least some of the seedlings to sprout prior to the spreading step.

The novel features which are considered as characteristic of the present invention are set forth in particular in the appended claims. The improved netting itself however, both as to its construction and the mode of making and using the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
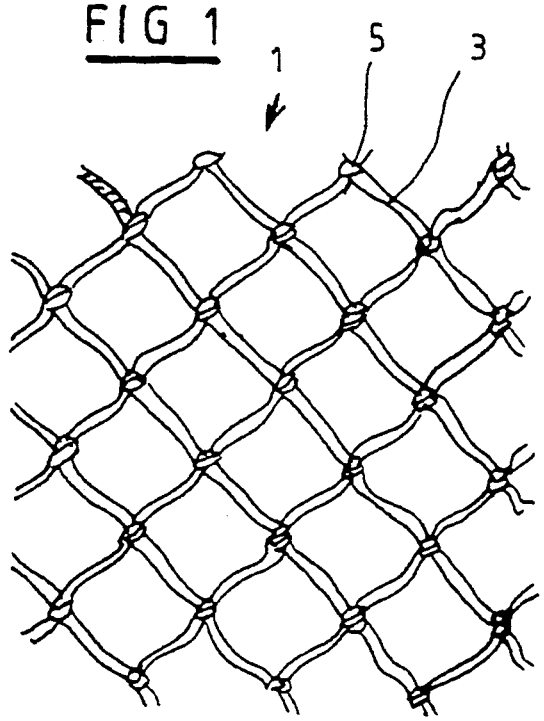
FIG. 1 is a schematic elevational view of a netting wherein the cords carry seedlings in accordance with a feature of the invention.

FIG. 1 shows a portion of a netting or network 1 with diagonally extending cords 3 which are connected to each other by knots 5 to form a square mesh. It is equally possible to form any other suitable pattern of interconnected cords 3. The material of the cords 3 can be a readily decomposable substance, a non-decomposable substance, or a mixture of decomposable and non-decomposable substances, depending on the desired useful life of the netting 1. A netting of the type shown in FIG. 1 can be produced in available machines, e.g., in machines which are used for the making of fishing nets.

Figure 2:
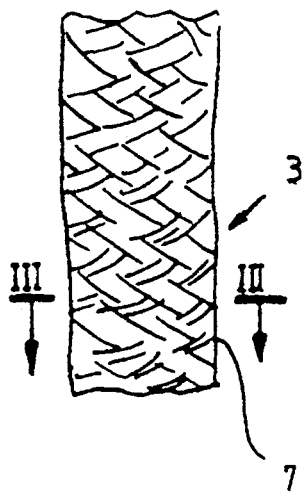
FIG. 2 is an enlarged elevational view of a portion of a cord in the netting of FIG. 1.
Figure 3:
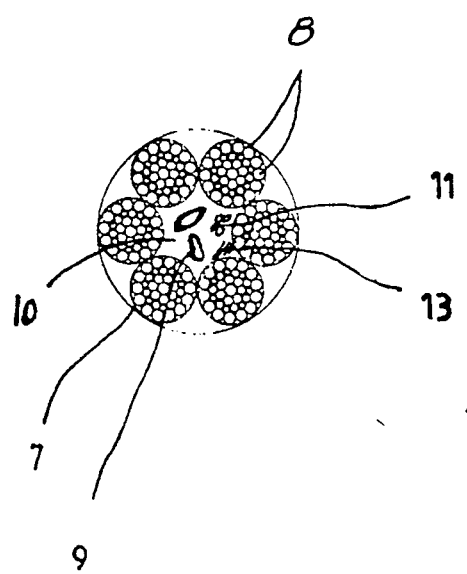
FIG. 3 is a sectional view substantially as seen in the direction of arrows from the line III—III in FIG. 2.

As can be seen in FIGS. 2 and 3, each cord 3 can be assembled of several strands 7 which are interwoven or otherwise interlaced and each of which can consist of a plurality of interwoven or otherwise interconnected filaments 8. It is equally possible to twist the filaments 8 into strands 7 and/or to twist the strands 7 into cords 3. Any other techniques can be resorted to with equal or similar advantage.

The cord 3 which is shown in FIGS. 2 and 3 does not comprise a flexible core which is used in the cords of many fishing nets in order to enhance the tensile strength of the cords. Instead, the strands 7 of the cord 3 form an enclosure or envelope with an internal space 10 for discrete seedlings 9 each of which can constitute a small seed ready to sprout in response to heating, watering and fertilizing. The seedlings 9 are introduced into the respective enclosures or envelopes during the making of the cords 3, i.e., during weaving of the strands 7 into a substantially tubular body which defines a central passage or space 10 for confinement of a supply of randomly or uniformly distributed identical and-/or different seedlings 9. The enclosure for the seeds 9 can further accommodate particles 11 of a suitable fertilizer (such as humus) and/or particles 11, 13 of several fertilizers, e.g., humus 11 or 13 and a second fertilizer 13 or 11. The quantity of particles 11 and/or 13 in the enclosure of FIG. 3 will depend upon the nature and number of seedlings 9 as well as on the nature of the material of strands 7 and cords 3. Thus, if the entire cord 3 is made of a readily decomposable material which then serves as a fertilizer, the quantity of confined fertilizer 11, 13 and/or other growth promoting material can be reduced, or such material is dispensed with. As already mentioned above, the exact manner of making the strands 7 and/or the cords 3 forms no part of the present invention; the procedure can involve weaving, twisting, knitting, braiding, plaiting and/or others.

Figure 4:
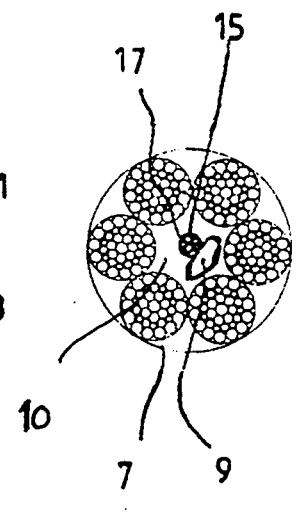
FIG. 4 is a similar sectional view of a modified cord.

FIG. 4 shows that a cord 3 can be made of strands 7 and can further include a flexible core 15 which is confined in the longitudinally extending passage or internal space 10 within the annulus of strands 7 and carries a set of uniformly or non-uniformly distributed (i.e., equidistant or non-equidistant) seedlings 9. The seedlings 9 can be adhesively secured to the core 15, e.g., by an adhesive 17 (such as molasses) which also serves as a fertilizer. The core 15 can be used with advantage if the manufacturer desires to distribute metered quantities of seedlings 9 per unit area of the netting 1. For example, the core 15 can be coated with a layer 17 of molasses in a first step and is then caused to pass through a container for a supply of seeds 9 so that the seeds adhere to the layer of molasses and are thereupon introduced into the passage 10 defined by the strands 7 of FIG. 4. Alternatively, the tubular enclosure including the six strands 7 of FIG. 4 can be formed around the core 15, around its adhesive layer 17 and around the seeds 9 which adhere to the adhesive layer. Such work can be performed in a suitable braiding or like machine.

The finished netting 1 can be stored for short or extended periods of time. As a rule, the seedlings 9 will begin to sprout or will continue to sprout subsequent to watering, heating and/or exposure to light.

When the netting is ready for use, it is spread out over a selected piece of land and can be separably or more or less permanently affixed to the ground by means of nails or in any other suitable way. It is often preferred to drive the cords 3 of the spread out netting 1 at least slightly into the ground, particularly into a relatively soft ground, in order to ensure that the roots of sprouting seedlings 9 will come into contact with and will grow into the ground as soon as possible. This reduces the likelihood of loss of seedlings 9 under the action of wind and/or rain. For example, a properly spread out netting 1 can be pressed against or into the ground by one or more rollers, wheels or the like. The arrangement may be such that at least one-half of each cord 3 is embedded in the ground when the rolling operation is completed.

If the thus applied netting 1 is subjected to satisfactory treatment, such as watering, exposure to light and/or adequate heating, the seedlings 9 can begin or continue to sprout after a short period of time, e.g., within days. Some sprouting can begin while the seedlings 9 are still confined in the passages 10 of tubular bodies of the type shown in FIGS. 3 and 4, especially if the moisture content of seedlings 9 and/or cords 3 is relatively high. Sprouting is enhanced by the particles 11 and/or 13 of fertilizer and/or as a result of decomposition of the cords 3. The developing roots penetrate through or between the strands 7 of the cords 3 and find their way into and are thus anchored in the ground. The likelihood of expulsion of seedlings 9 from the cords 3 is greatly reduced as soon as the seedlings begin or continue to sprout because even the very fine roots which develop during the initial stages of growth contribute to a pronounced anchoring action which ensures that the seedlings are retained in the respective cords 3 before the growing seedlings become adequately anchored in the ground. Such anchoring action is desirable and advantageous under any and all circumstances, especially when the netting is applied over a terrain which is exposed to pronounced wind or is located in a wet climate.

The material of the cords 3 can be selected in such a way that it decomposes within a selected interval of time, e.g., within a certain number of months. This provides additional fertilizer for the plants which constitute growing seedlings 9 and causes the cords 3 and the knots 5 to disappear, i.e., only the plants remain and such plants are reliably anchored in the ground. If the cords 3 are to remain intact for longer periods of time, they can be made (either entirely or in part) of a non-decomposable material, such as a synthetic plastic substance which is capable of retaining the developed plants against the action of the wind and/or rain for longer periods of time. By way of example, a long-lasting netting 1 will be put to use on terrain which provides a frequent path for avalanches, rock slides and similar undesirable phenomena.

The seedlings 9 can be selected to grow into grass stalks, bushes, trees and/or other forms of vegetation, depending on the nature and exposure of the selected terrain for spreading of the netting 1.

If the persons or authorities in charge desire to ensure rapid anchoring of seedlings 9 in the selected piece of land, the netting 1 can be exposed to light, moisture and/or heat prior to spreading. This ensures a certain amount of sprouting of seedlings 9 prior to actual contact of cords 3 with the ground. Such procedure may be desirable and advantageous when the netting is to be spread out on a pronouncedly sloping and/or barren or practically barren terrain. Sprouting of seedlings 9 prior to actual spreading of the netting 1 can last for one or more days or even longer, depending on the influences to which the seedlings are subjected, on the nature of selected terrain and/or on the nature of seedlings.

An important advantage of the netting 1 is that it renders it possible to ensure uniform distribution of seedlings 9 over a selected terrain. Moreover, the netting shields the seedlings during the initial stages of growth subsequent to spreading out on a selected piece of land so that the seedlings are less likely to be eaten up by birds, mice and/or other animals. Still further, the netting 1 protects the seedlings from wind and/or rain and can even serve as the only fertilizer or as a fertilizer in addition to that or in addition to those which are embedded into and/or otherwise carried by the cords 3. In accordance with one presently preferred embodiment, the improved netting can be utilized as a means for establishing a vegetable cover on terrain which is used as a ski trail during the winter season. A further important advantage of the improved netting is that it can readily conform to the outline of any selected terrain, i.e., to flat horizontal terrain, to hilly terrain, to pronouncedly sloping terrain and even to vertical terrain, and can be readily affixed to the selected piece of land in any suitable or readily available manner. The cords 3 can be maintained in intimate contact with the ground regardless of the outline of the selected terrain.

Still another advantage of the improved netting is that it ensures uniform or even highly uniform distribution of seedlings. Moreover, the distribution can be in accordance with any of a number of different patterns, depending upon the design of the netting and/or on the distribution of seedlings 9 in its cords 3.

The cords 3 can further serve as minute reservoirs for moisture. Thus, if the strands 7 are moistened prior to interweaving and/or other mode of interlacing to form the cords 3, and if the interweaving results in the formation of tightly woven or knit or otherwise made strands, the cords 3 are capable of retaining a certain amount of moisture for long periods of time. This is often desirable and advantageous, for example, if the netting 1 is not readily accessible for frequent watering. The number of strands 7 in and the dimensions of cords 3 can be selected in such a way that the weight of the cords alone suffices to ensure continuous contact with the ground and hence immediate penetration of roots of sprouting seedlings 9 into the terrain.

If the filaments 8 consist of cotton, the cords 3 can remain intact for months or even years to thus furnish a fertilizer (or an additional fertilizer) in the course of and upon completed decomposition. Such filaments are desirable and advantageous for many purposes because they do not leave any remnants in or on the ground and perform a useful function (fertilizing) even while they are in the process of undergoing decomposition. The filaments 8 (or at least some of these filaments) will be made of a non-decomposable material (e.g., a plastic substance) if the nature of the terrain is such that retention of growing plants at the selected locations is desirable or necessary for long periods of time. This may be desirable or necessary if the netting 1 is spread out on terrain which exhibits a highly pronounced slope and/or on terrain which is exposed to strong winds and/or extensive rainfall. The non-decomposable cords 3 then cooperate with the existing vegetation to reliably retain the developing seedlings 9 at a desired distance from each other as well as properly anchored in the top soil (if any).

The diameters of the cords 3 will depend on the nature of vegetation which is to develop on a selected piece of land. For example, the netting 1 can comprise thick or even very thick cords 3 if the seedlings 9 are to develop into trees or bushes, but the diameters of the cords will be or can be much smaller if the seedlings 9 are to develop into grass stalks. Of course, a netting 1 can carry a mixture of seedlings 9 including those which are to develop into grass as well as those which are to grow into greens and/or bushes. Relatively lightweight nettings 1 with small-diameter cords 3 can be used if the land to be covered with vegetation constitutes a ski trail in the winter season but should be covered with grass during the remaining months of each year. Reestablishment of a grass carpet on ski slopes is much more satisfactory by resorting to the improved netting than by spreading seeds directly onto the denuded or partially denuded terrain. The same holds true when the improved netting is used to reestablish a carpet of grass in a sports arena, such as a soccer, baseball or football stadium. This is due to the fact that the cords 3 of the netting 1 retain the seedlings 9 in desired positions for rapid and reliable anchoring in the selected terrain for any desired interval of time, i.e., until the developing seedlings are capable of standing the mechanical and/or other influences by being firmly rooted in the ground.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A netting assembly comprising:
   (a) a plurality of seedlings;
   (b) a plurality of cords being connected together by knots, at least some of said cords including a plurality of strands, said plurality of strands forming an enclosure, said seedlings being housed within said enclosure to thereby protect said seedlings; and
   (c) means for reinforcing an area to be covered by said netting assembly, said reinforcing means including distributing, throughout the netting assembly, an anchoring force of a plurality of developing roots, germinating from said seedlings, which penetrate said covered area.

2. The netting of claim 1, wherein at least some of the seedlings are at least partially confined in the respective enclosures.

3. The netting of claim 2, wherein at least some of the seedlings are loosely received in the respective enclosures.

4. The netting of claim 2, wherein at least some of the seedlings are at least partially embedded in the respective cords.

5. The netting of claim 2, wherein said at least some cords further comprise elongated cores within the respective enclosures and at least some of the seedlings which are carried by said at least some cords are carried by the respective cores.

6. The netting of claim 5, wherein said at least some seedlings are bonded to the respective cores by an adhesive.

7. The netting of claim 6, wherein said adhesive contains molasses.

8. The netting of claim 6, wherein said adhesive contains a fertilizer.

9. The netting of claim 1, further comprising particles of fertilizer intermixed with said seedlings.

10. The netting of claim 9, wherein said fertilizer includes humus.

11. The netting of claim 1, wherein at least some of said cords consist, at least in part, of a decomposable material.

12. The netting of claim 1, wherein at least some of said cords consist, at least in part, of a non-decomposable material.

13. The netting of claim 1, wherein said cords contain decomposable and non-decomposable materials.

14. The netting of claim 1, wherein said seedlings include germinating seeds.

15. A method for establishing a vegetable cover on at least partially denuded land comprising the steps of:
   (a) spreading a netting assembly over the partially denuded land, said netting assembly including a plurality of seedlings, a plurality of cords being connected together by knots, at least some of said cords including a plurality of strands, said plurality of strands forming an enclosure, said seedling being housed within said enclosure;
   (b) fixing said netting assembly to said land; and
   (c) embedding said netting assembly at least partially into said land.

16. The method of claim 15, further comprising the step of fertilizing the seedlings including applying fertilizer to the cords.

17. The method of claim 15, further comprising the step of making the cords at least in part of a decomposable material which serves as a fertilizer for the seedlings.

18. The method of claim 15, further comprising the step of causing at least some of the seedlings to sprout prior to said spreading step.

* * * * *